April 17, 1962   L. W. DISLER ET AL   3,030,077
INTEGRAL EBULLIENT COOLER
Filed July 13, 1959   2 Sheets-Sheet 1

INVENTOR.
BY Loyd W Disler
Harry W. Evans

April 17, 1962   L. W. DISLER ET AL   3,030,077
INTEGRAL EBULLIENT COOLER

Filed July 13, 1959   2 Sheets-Sheet 2

INVENTOR.
BY *Loyd W Disler*
*Harry W Evans*

United States Patent Office 3,030,077
Patented Apr. 17, 1962

3,030,077
INTEGRAL EBULLIENT COOLER
Loyd W. Disler, 6703 E. 27th, and Harry W. Evans, 4409 S. Lewis, both of Tulsa, Okla.
Filed July 13, 1959, Ser. No. 826,553
3 Claims. (Cl. 257—314)

This invention relates to a new and useful device to be used in removing waste heat from internal combustion engines by ebullient cooling. This device is used for separating steam and water, condensing steam, maintaining a constant lube oil temperature and maintaining a constant elevated source of water at its boiling point for delivery by gravity flow to engine cooling jackets all combined in one integral unit.

Summary

The invention is used in the dissipation of rejected heat from internal combustion engine cylinders to the atmosphere and to maintain constant engine and lubricating oil temperatures. It is used for separating steam and water from engine jackets in an ebullient cooling system for internal combustion engines. The name of the unit is: integral ebullient cooler.

It is customary in the standard ebullient cooling system to separate the steam and water, condense the steam and remove heat from lube oil in separate units. It is the object of this invention to separate the steam and water, condense the steam and remove heat from lube oil in the same unit, thereby effecting economies of space and materials. It is the further object of this invention to provide means of controlling the lube oil temperature.

Another object is to provide an ebullient cooler which may be inexpensively and easily manufactured yet be durable, compact, and positive in its operation.

A further object of importance is to provide an ebullient cooler that is compact, easy to operate, and dependable under all operating conditions.

Description of Drawings

The integral ebullient cooler, illustrated by the attached drawing of which

Refer to FIGS. 1, 2, 3 and 4

Components of the invention are identified as follows: Shell 1 is a cylindrical cover for the tube sheet, 2 a rectangular bar; 3 is the plug sheet, also a rectangular bar; 4 is a system of baffles used to keep the water from flowing through the tubes; 5 is a device for extracting droplets of moisture from steam going to the condenser tubes; 6 is the end plates; 7 is a connecting passageway between the upper water storage space 8, located each side of the tube sheet 2; 9 is the separating space for steam and water; 10 is steam and water inlet connection from an engine 20; 11 is a condensate outlet connection to the engine jackets; 12 is the heat exchanger tubes for condensing steam; 13 is an overflow pipe to insure that the condensate return pump has a flooded suction; 14 is the condensate lift pipe; 15 is a combination condensate accumulator for the steam condensate and body shell for the lube oil exchanger; 16 is the lube oil exchanger; 17 is a pump for returning condensed steam to the steam and water separator; 18 is a distribution trough; and 19 is a condensate distributor to insure that there is intimate contact between the water and steam.

Description of Operation

Figure 1:
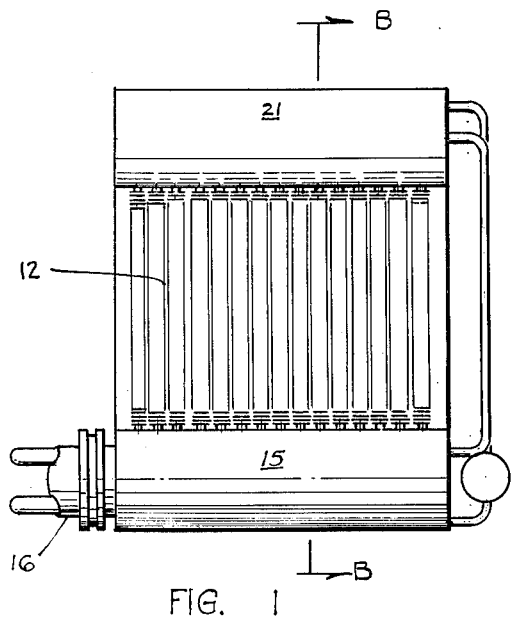
FIG. 1 is a front elevation.
Figure 2:
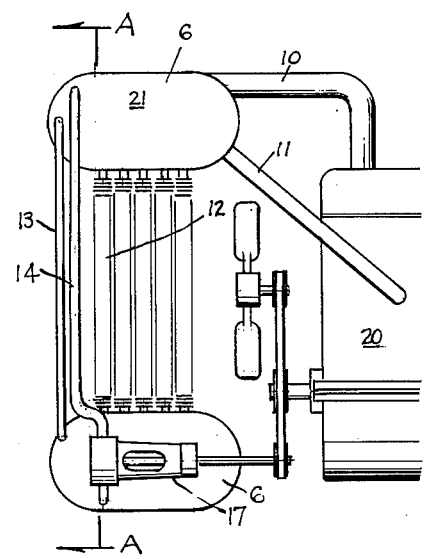
FIG. 2 is a side view of the unit.
Figure 3:
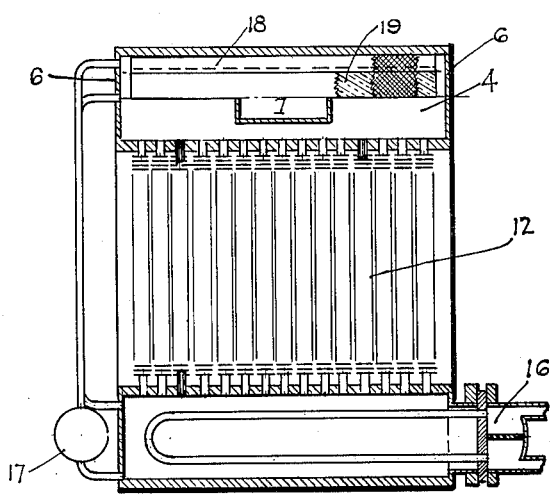
FIG. 3 is a cross-section of the unit at A—A.
Figure 4:
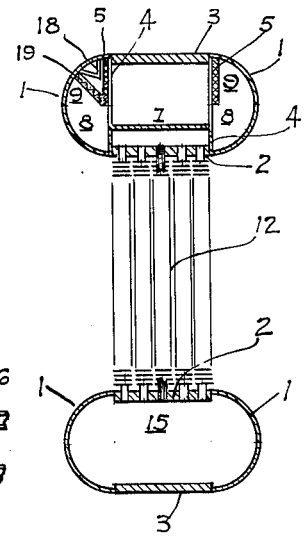
FIG. 4 is a sectional view of the steam and water separator taken at B—B.

Operation of the integral ebullient cooler is as follows: In FIG. 2, 20 is an internal combustion engine from which heat is being rejected in the water jackets. Water at its boiling point is supplied to the cylinder from the steam and water separator 8, through connecting pipe 11. As the rejected heat from the engine is conducted to the water, steam is generated in the water jackets of the engine 20. As the steam is formed it rises in the jackets and induces a flow of steam and water upward through the water jacket and connecting steam and water pipe 10, to the steam and water separator 21. Inside the steam and water separator the fluid is allowed to come to rest, the steam being lighter than water disengages from the water and rises to the upper portion 9 of the steam and water separator, and thence through the mist extractor to the condenser tubes 12. As steam enters the condenser tubes 12, it is condensed, thus creating a low pressure area which allows a continuous flow of steam to the condenser section. Heat is removed from the condenser section by passing air or other cooling medium across the outside of the tubes. The condensate then falls by gravity to the accumulator 15, where it is picked up by the condensate pump 17, and returned through pipe 14 to the distribution trough 18 inside the steam and water separator. The water pump is of sufficient capacity to pump more water than is being condensed. Excess water then flows by gravity from the steam and water separator to the condensate accumulator through connecting pipe 13. This excess water flow assures that there will be an adequate supply of water for the condensate pump at all times, in addition to maintaining a constant temperature of the water in the condensate accumulator. Lubricating oil from the engine crankcase is pumped by the engine lube oil pump through the lube oil cooler 16, which is enclosed inside the condensate accumulator. Heat from the lube oil is dissipated to the water in the condensate accumulator.

Figure 5:
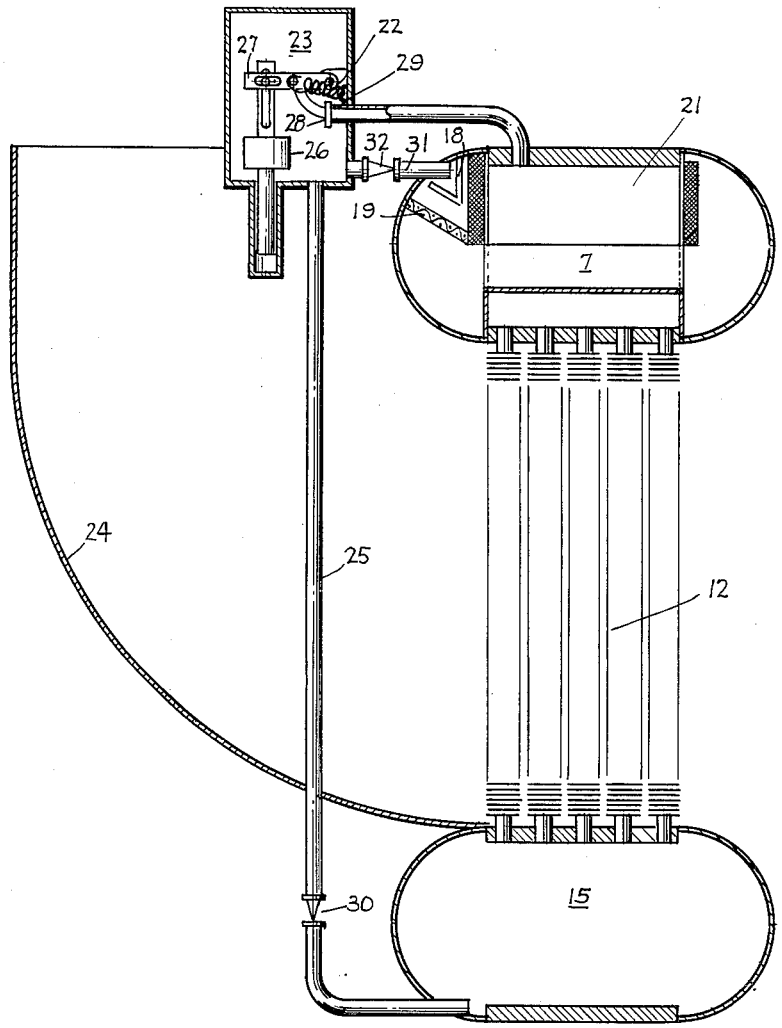
FIG. 5 is a sectional view showing the unit with an automatic water lift of this inventon.
Figure 6:
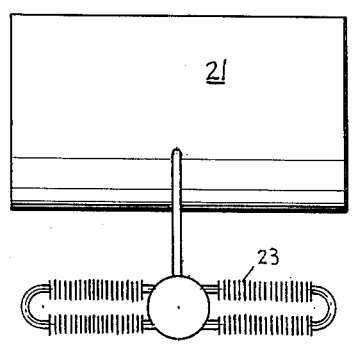
FIG. 6 is a plan view of unit showing steam condenser used with automatic water lift.

In air cooled condensers the condensate pump may be replaced by an automatic water lift as shown in FIG. 5. The operation of the automatic water lift is as follows: Steam space 23 is filled with steam. Cooling air is diverted past the automatic water lift by the air duct 24, thereby condensing the steam in steam space 23, thus creating a vacuum which draws water through pipe 25 from the condensate storage tank 15. As water flows into steam space 23, through pipe 25 float 26 rises until it lifts lever 27, to open valve 28 off its seat 29, admitting steam again into the steam space 23. Water is prevented from returning to the condensate storage tank 15 by check valve 30. When pressure is equalized between the steam and water separator and the automatic water lift, water flows to the steam and water separator from the automatic water lift through pipe 31. Water is prevented from flowing from the steam and water separator 21 to the automatic water lift by check valve 32. When sufficient water is drained from the tank the float moves lever 27 downward to close valve 28, and the cycle is repeated. Spring 22 is eccentric and holds valve 28 in either an open or closed position until actuated by float 26.

We claim:
1. An automatic water lift for use with an integral ebullient cooling system having an upper steam receiving vessel, a lower condensate receiving vessel and fluid passage means connecting said upper steam receiving vessel with said lower condensate receiving vessel to accommodate fluid flow therebetween, comprising, in combination, a closed steam cavity positioned at an elevation above said upper steam receiving vessel; a condensate intake pipe connecting said steam cavity with said lower condensate receiving vessel; a check valve positioned in said condensate intake pipe adaptable whereby condensate is permitted to flow from said lower condensate receiving vessel to said steam cavity but is restrained from flowing in the opposite direction; a steam pipe connecting said steam cavity with said upper steam receiving vessel; means of closing said steam pipe when said steam cavity is substantially filled with steam whereby said steam is trapped in said steam cavity; means of condensing said steam trapped in said steam cavity whereby a vacuum is created drawing condensate through said condensate intake pipe from said lower condensate receiving vessel into said steam cavity; means of opening said steam pipe when the level of said condensate in said steam cavity reaches a predetermined level whereby pressure in said steam cavity and said upper steam receiving vessel is equalized; a condensate return pipe connecting said steam cavity with said upper steam receiving vessel whereby said condensate drawn into said steam cavity is discharged into said upper steam receiving vessel when pressure of said vessels is equalized; and a check valve positioned in said condensate return line whereby said condensate return line is closed when said steam cavity is under vacuum relative to said upper steam receiving vessel.

2. An automatic water lift according to claim 1 wherein said means of condensing said steam trapped in said steam cavity comprises heat exchanger finned tubes in closed communication with said steam cavity.

3. An automatic water lift according to claim 1 wherein said means of closing said steam pipe when said steam cavity is substantially filled with steam and wherein said means of opening said steam pipe when the level of condensate in said steam cavity reaches a predetermined level comprises, a lever pivotably mounted with respect to said steam cavity; a valve seat affixed to said steam pipe; a valve affixed to said lever adaptable to close against said valve seat to close said steam pipe when said lever pivots toward said valve seat; and a float means positioned in said steam cavity and affixed to said lever whereby said lever is pivoted away from said valve seat when the condensate in said steam cavity reaches a predetermined level opening said steam pipe and whereby said lever is pivoted toward said valve seat as steam replaces said condensate in said steam cavity to close said steam pipe.

References Cited in the file of this patent

UNITED STATES PATENTS

| | | |
|---|---|---|
| 1,608,600 | Howe | Nov. 30, 1926 |
| 2,054,403 | Yeager | Sept. 15, 1936 |
| 2,083,611 | Marshall | June 15, 1937 |
| 2,235,806 | Walker et al. | Mar. 18, 1941 |
| 2,343,145 | Heiney | Feb. 29, 1944 |

FOREIGN PATENTS

| | | |
|---|---|---|
| 176,087 | Great Britain | Feb. 27, 1922 |
| 334,897 | France | Jan. 5, 1904 |